(12) United States Patent
Yegoshin

(10) Patent No.: US 7,613,174 B2
(45) Date of Patent: *Nov. 3, 2009

(54) TELECOMMUNICATION SYSTEM FOR AUTOMATICALLY LOCATING BY NETWORK CONNECTION AND SELECTIVELY DELIVERING CALLS TO MOBILE CLIENT DEVICES

(75) Inventor: Leonid A. Yegoshin, Palo Alto, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 11/386,550

(22) Filed: Mar. 21, 2006

(65) Prior Publication Data

US 2006/0183499 A1    Aug. 17, 2006

Related U.S. Application Data

(63) Continuation of application No. 10/777,622, filed on Feb. 11, 2004, now Pat. No. 7,116,655, which is a continuation of application No. 09/255,048, filed on Feb. 22, 1999, now Pat. No. 6,711,146.

(51) Int. Cl.
*H04L 12/66* (2006.01)
(52) U.S. Cl. ....................... 370/352; 352/338
(58) Field of Classification Search ........... None
See application file for complete search history.

(56) References Cited

U.S. PATENT DOCUMENTS

| 6,061,346 | A * | 5/2000 | Nordman | 370/352 |
| 6,253,326 | B1 * | 6/2001 | Lincke et al. | 726/12 |
| 6,418,324 | B1 * | 7/2002 | Doviak et al. | 455/426.1 |
| 6,601,346 | B2 * | 8/2003 | Nozaki | 49/498.1 |
| 6,608,832 | B2 * | 8/2003 | Forslow | 370/353 |
| 6,711,146 | B2 | 3/2004 | Yegoshin | |
| 2004/0160932 | A1 | 8/2004 | Yegoshin | |
| 2006/0023676 | A1 * | 2/2006 | Whitmore et al. | 370/338 |
| 2006/0251035 | A1 * | 11/2006 | Yegoshin | 370/338 |
| 2007/0037569 | A1 * | 2/2007 | McNiff et al. | 455/422.1 |

* cited by examiner

*Primary Examiner*—Duc C Ho
(74) *Attorney, Agent, or Firm*—Donald R. Boys; Central Coast Patent Agency, Inc

(57) ABSTRACT

A communication system for an organization having multiple sites uses a dual-mode device capable of both cell phone communication and telephone communication on a local area network (LAN). IP LANS are established at organization sites such that a temporary IP address is assigned to a dual-mode device that logs onto an organization LAN, and the IP address is associated at a PSTN-connected server on the LAN with the cell phone number of the communication device. The IP server notifies a PSTN-connected routing server when a device logs on to a LAN, and also provides a destination number for the IP server. Cell calls directed to the device are then redirected to the IP server and directed to the device connected to the LAN.

4 Claims, 3 Drawing Sheets

TELECOMMUNICATION SYSTEM FOR AUTOMATICALLY LOCATING BY NETWORK CONNECTION AND SELECTIVELY DELIVERING CALLS TO MOBILE CLIENT DEVICES

The present application is a continuation application of patent application Ser. No. 10/777,622, filed on Feb. 11, 2004, now U.S. Pat. No. 7,116,655 which is a continuation of patent application Ser. No. 09/255,048, filed on Feb. 22, 1999 and issued as U.S. Pat. No. 6,711,146 on Mar. 23, 2004, which are incorporated herein in their entirety by reference.

FIELD OF THE INVENTION

The present Invention is in the field of telephony communications including data network telephony (DNT), which encompasses Internet Protocol Network Telephony (IPNT), and pertains more particularly to methods and apparatus for locating by network connection and selectively delivering calls to mobile client devices.

BACKGROUND OF THE INVENTION

The art of telephony communication has grown in proportion with improved telephony infrastructure, equipment, and methods of practice. Conventionally and historically telephone communication has been practiced by use of networks that provide dedicated connections and guaranteed bandwidth, such as in Publicly Switched Telephony Networks (PSTN). In such networks a call placed from a telephone connected to a local service is switched over dedicated channels to a destination, and as long as the connection is maintained, the dedicated path, having a dedicated bandwidth, is also maintained. Such networks may be termed Connection Oriented/Switched Telephony (COST) networks.

More recently, with the development of extensive data networks, of which the well-known Internet is a prime example, a newer type of telephony communication has been introduced. This form of telephony is termed herein Data Network Telephony (DNT), and, in the context of the Internet data network Internet Protocol Network Telephony (IPNT). Data networks typically link computers over one or more sub-nets, which may include local area networks (LAN), wide area networks (WAN) such as the Internet, company Intranets, and combinations of these and other data networks. IPNT telephony may be practiced on any suitable switched-packet data network whether wired or wireless provided suitable protocol is supported.

In DNT, such as IPNT, dedicated connections are not generally provided. Instead, digital audio data is prepared in standardized audio packets complete with header information and the like. The packets are prepared in near real-time and broadcast over the data network(s) connecting involved computers or telecommunications devices adapted for DNT applications. The header for each packet includes a destination for the packet.

Data Network Telephony, such as IPNT is well known in the art, and wireless data transmission is also quite well known in many applications. Internet service providers, for example, are recently providing high data-rate wireless Internet access by satellite systems, and, where bandwidth is not substantially restricted at the receiver's end.

The problems for Data Network Telephony in wireless systems are related to the real-time nature of telephony data and the typically limited bandwidth available in such systems. In relatively high-bandwidth systems having a relatively large number of users the distribution probabilities provide a situation where it is uncommon for several or many users to demand unusual bandwidth at the same time. The phenomenon is known in the art as averaging. Even with known high-use times, it can be expected that distribution will be such that bandwidth will be adequate.

A contributing problem is in the nature of real-time audio data as opposed to data transmitting stored documents and the like, which may be called data-data as opposed to voice-data. Data-data such as graphics files, text files, and the like are stored and prepared for transmission wherein the file size is known. Late-arriving packets is not an issue as downloading is not complete until every packet is received. If for some reason transmission is lost, a re-connect may be performed to retrieve the rest of the file. Voice-data packets for real-time conversations are different. The packets for voice-data have to be prepared and transmitted in essentially real time in both directions or a meaningful conversation cannot be held. COST connections and wireless connections, wherein bandwidth is assured, have no problem with real-time voice communication.

More recent developments regarding quality-of-service (QOS) and analog-to-IPNT conversion and compression techniques have greatly improved the capability of IP networks having a lesser assurance of available bandwidth to facilitate real-time communication wherein the caller is calling from a cellular or a COST network.

With respect to Internet Protocol (IP) networks that are private and set up by companies to, for example, cover a large technical campus, it is known to the inventors that calls may arrive from COST or cellular digital networks, and to be converted to IPNT format for distribution to addressed telecommunications devices that are connected to the network. For example, certain connected computers, DNT capable telephones, and the like are capable of receiving from, and sending calls to a cellular or COST network such as a PSTN network. Such an IP network is usually of the form of a wired LAN such as an Extranet or Intranet. However, it is known to the inventor that such networks may also operate in various wireless technology modes such as a code-division-multiple-access CDMA or a time-division-multiple-access (TDMA) convention. The well-known cellular system is typically a variation of the latter. RF, microwave, and infrared technologies are also used. Improvements in bandwidth-reserving technology combined with smart IPNT routing capability such as is known to the inventor have made accepting COST or cellular calls from an out-side network practical.

Often, company sites maintaining LAN's as described above, whether wired or wireless, have frequent visitors from other sites, and the visitors are not resident employees and therefore typically do not have LAN-connected communication devices personally addressed to them at the visited campus. Such individuals may be required to move from one site to another spending an unpredictable time at each site. Consultants, sales people, regional managers, and the like make up this category of possible visitors. An especially large organization, such as a government organization, may have a large number of such visitors or mobile employees roaming through the sites at any given time.

Typically, such individuals would carry cellular telephones or equivalent devices for communication with, for example, callers from a home office, or other business calls. Depending on where such an individual lives or works, he or she may be required to extend the mobile communication range of a cellular device. This is termed roaming in the art. If the organization is significantly large or distributed over a large geographic region, he may have to roam over more than one service area. The cost of communication on a cellular phone increases has he roams further from a primary service area.

Often individuals use telephones designated to resident individuals or workers at a visited location to avoid costly cell charges. However, such resident individuals may be inconvenienced by having to take calls for the visitors. If calls are many, the resident individuals duties may be interrupted. It would be desirable then, to have a cell phone or equivalent device adaptable to a wireless or wired IP network at the location or site that a person may be visiting, and have incoming calls forwarded to the connected to the device. Such a telephone device and a system cooperating with the device, could enable substantial cost savings for the sponsoring organization.

What is clearly needed is a method and apparatus that would allow a visitor to an IP LAN-connected site to plug in or otherwise connect his or her mobile telephone device to the local IP LAN, so that calls coming from any source network may be routed to the user's device on the LAN.

SUMMARY OF THE INVENTION

In a preferred embodiment of the present invention a dual-mode communication device is provided, comprising microphone and speaker apparatus including converters for rendering audio data as audible speech, and for rendering audible speech as audio data; a first communication interface comprising circuitry for receiving and sending the audio data on a cell-phone network; and a second communication interface comprising circuitry for connecting to a local area network (LAN), and for receiving and sending the audio data on the LAN. In some embodiments the dual-mode communication device is implemented in the form of a cell phone. In some embodiments the circuitry for connecting comprises a connector for engaging a hard-wired LAN. In other embodiments the circuitry for connecting comprises apparatus for communicating with a wireless IP-LAN. There are control routines for negotiating a temporary IP address with the LAN upon connecting to the LAN.

In an other aspect of the invention a system for telephone communication is provided, comprising an IP-LAN including an IP telephony server; a dual-mode communication device comprising first apparatus for conducting telephone calls on a cell-phone network, including a cell-phone number, and second apparatus for conducting telephone calls over the IP-LAN; a publicly-switched telephone network (PSTN) having a trunk connection to the IP telephony server; and a PSTN-connected routing server. The IP telephony server, upon connection of the dual-mode communication device to the IP-LAN, assigns a temporary IP address to the connected device and informs the routing server of the connection and a destination number for the IP telephony server, and wherein the routing server then routes calls for the cell phone number to the IP telephony server, which in turn routes the calls on the IP-LAN to the temporary IP address.

In some embodiments of the system the routing server is hosted by a cell-phone network. In other embodiments the routing server is a part of a PSTN service control point (SCP). The IP-LAN may be a wireless LAN. In some embodiments the system may have a user-editable profile at the cell-phone routing server, enabling a user to list first origination numbers for cell network delivery and second origination numbers for LAN network delivery, wherein the cell-phone routing server delivers all calls on the cell network unless the dual-mode communication device is logged onto the LAN, in which case all calls from first origination numbers are delivered on the cell network and calls from the second origination numbers are delivered on the LAN.

In another aspect of the system an IP Local Area Network (IP-LAN) system is provided, comprising an IP telephony server connected on the LAN and to a publicly-switched telephony trunk; and control routines executing on the IP telephony server. The IP telephony server assigns a temporary IP address to a cell phone-capable device connecting on the LAN, and communicates the fact of connection and a destination number for the IP telephony server to a PSTN-connected routing server. In this system the PSTN-connected routing server may be hosted by a cell-phone network or may be a part of a PSTN service control point (SCP). The LAN may be a wireless network. In this system the IP telephony server associates the cell number of the cell phone-capable device with the IP address, and delivers calls received for the cell number to the cell-phone-capable device connected on the LAN.

In yet another aspect of the invention a method for minimizing cell phone charges for an organization having multiple sites is provided, comprising steps of (a) providing an IP-LAN at at least one organization site, the LAN having a PSTN-connected IP server; (b) providing at least one dual-mode communication device for use by organization personnel, the device capable of connection and communication on both a cell-phone network and on the LAN; (c) assigning a temporary IP address to the one or more dual-mode communication devices upon connection to the LAN; (d) associating the IP address with the cell phone number of the dual-mode communication device at the IP server; (e) communicating the cell phone number and a destination number for the IP server to a PSTN-connected router; and (f) routing calls for the cell phone number to the dual-mode communication device via a cell phone network during time the dual-mode device is not logged on to the LAN, and to the IP server for routing on the LAN during time the device is logged on to the LAN.

In the method provided, in step (e) the PSTN-connected router may be hosted by a cell-network provider or may be a part of a PSTN service control point (SCP). In embodiments of the invention for the first time a system is provided wherein users may receive cell calls between sites and may log on to local sites where calls may be delivered by local LANs, thereby minimizing communication costs for the organization hosting the sites. Embodiments of the invention are disclosed in enabling detail below.

BRIEF DESCRIPTION OF THE DRAWING FIGURES

DESCRIPTION OF THE PREFERRED EMBODIMENTS

According to an embodiment of the present invention, a subscriber-based service is provided that allows a cellular-capable device to receive calls routed through a COST network and over a private IP network.

Figure 1:
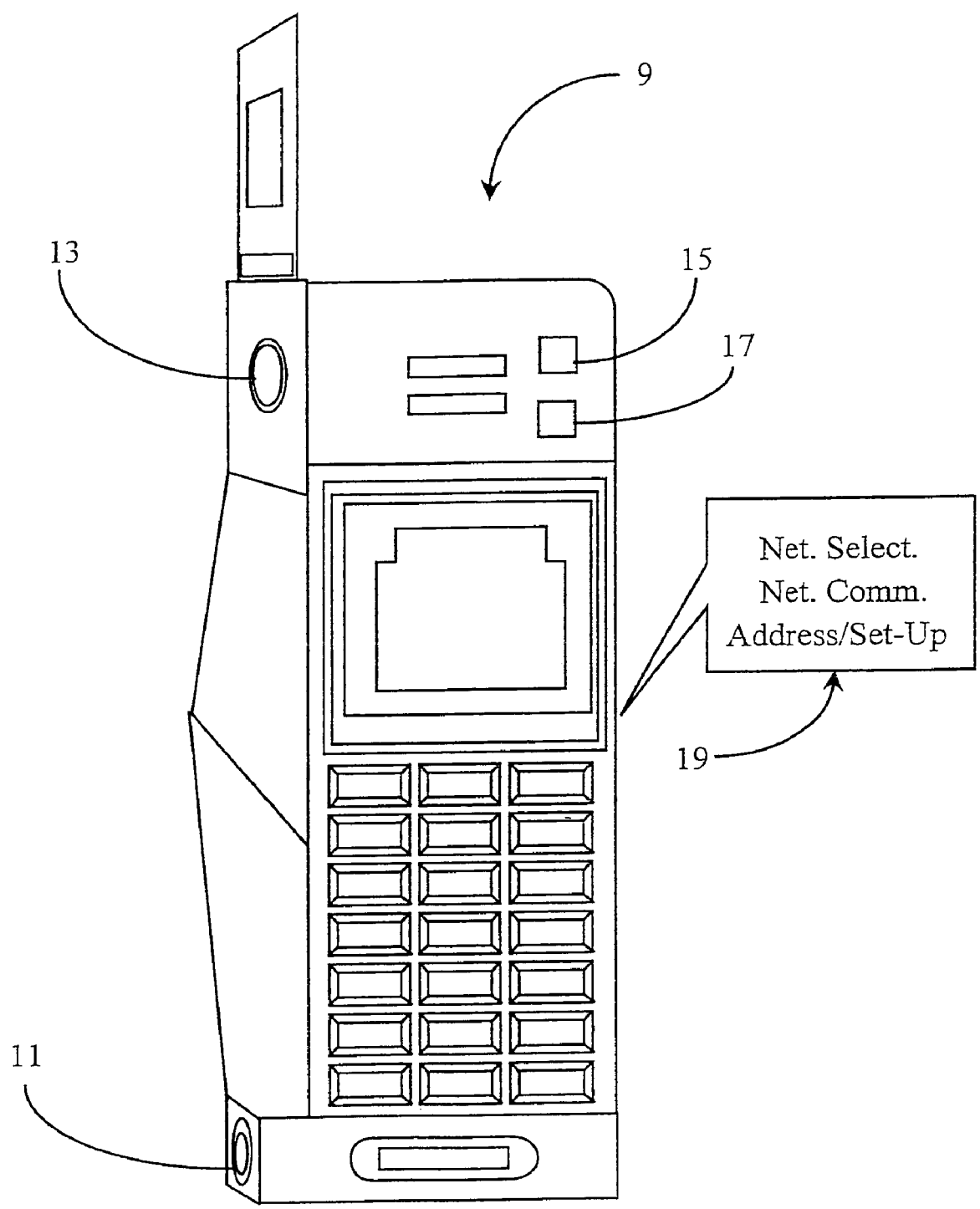
FIG. 1 is a front view of a cellular phone enhanced with additional communication ports and software according to an embodiment of the present invention.

FIG. 1 is a frontal view of a cellular phone 9 enhanced with additional communication ports and software according to an embodiment of the present invention. Cellular telephone 9 is capable of communication over a well-known pulse-code modulated/global system for mobile communication (PCM/GSM) cellular network and also capable of communicating on an IP data network in either a wired or wireless form.

Cellular phone 9 is not, however, the only form of telecommunications device that may be used to practice the present invention. For example, any type of wireless communication device may be used that may also be adapted for having at least one mode of IP communication via wireless and or wired connection. The purpose of using a cell phone, such as phone 9 in this embodiment, is because of the existence of readily available and well established global cellular network, and the proliferation of cell-phone users who often frequent company sites or other locations wherein IP networks are established for local communication.

Cell phone 9 operates as a normal cellular phone, and through additional circuitry and software becomes a multi-purpose device according to an embodiment of the present invention. In one embodiment a communication port 11 is provided for a user to plug-in to a wired IP network. Port 11 may be in one embodiment a standard 10-base T connection. Therefore, cell phone 9 may be plugged into a wired LAN network and become a communication device on that network.

In a preferred embodiment an adapter port 13 is also provided for communication in wireless mode on a wireless IP network having different protocols than the currently available cellular/PCS networks (CCNs) of such types as PCM, GSM, CDMA etc. For example, a wireless network adapter may be plugged in to port 13 to enable such as infrared network communication, microwave communication, or other wireless communication wherein protocol may not be compatible with CCN protocols.

A client software suite 19 enables a user to select a type of network for communication, to select a protocol for voice communication, and to set-up a temporary IP address on a network for the purpose of identifying and registering the device for normal operation on the network. Client software 19 may be provided by a plug-in smart card, or may be pre-loaded into a suitable built-in memory provided and adapted for the purpose. A series of selection buttons such as 15 and 17 allow a user to switch modes from cellular to IP communication, and perhaps to switch from differing types of networks using known protocols that are made available via client software 19. One such protocol is the recently-developed H323 IP protocol allowing different hardware-based devices to communicate with each other over separate networks. There may be more than 2 selection buttons such as buttons 15 and 17 without departing from the spirit and scope of the present invention. Alternatively, the program may be given a series of preferences by the user, and then may negotiate the best possible connection accordingly. It may use such protocols as DHCP etc. to set up IP addresses and so forth. Selection of the network could be according to an order of preference, by availability.

In one embodiment of the present invention cell phone 9 is capable of taking some calls via cellular path while receiving other calls via IP path. In such a situation, integrating software is provided to coordinate activity between the two paths. For example, if engaged with an IP call, an incoming cell call would get a busy signal and so on, or it would be redirected to the IP call point, where it would then be presented as a call-waiting call, if that feature set is available and enabled. In a preferred embodiment, phone 9 may be switched from one network capability to another at the user's discretion.

Figure 2:
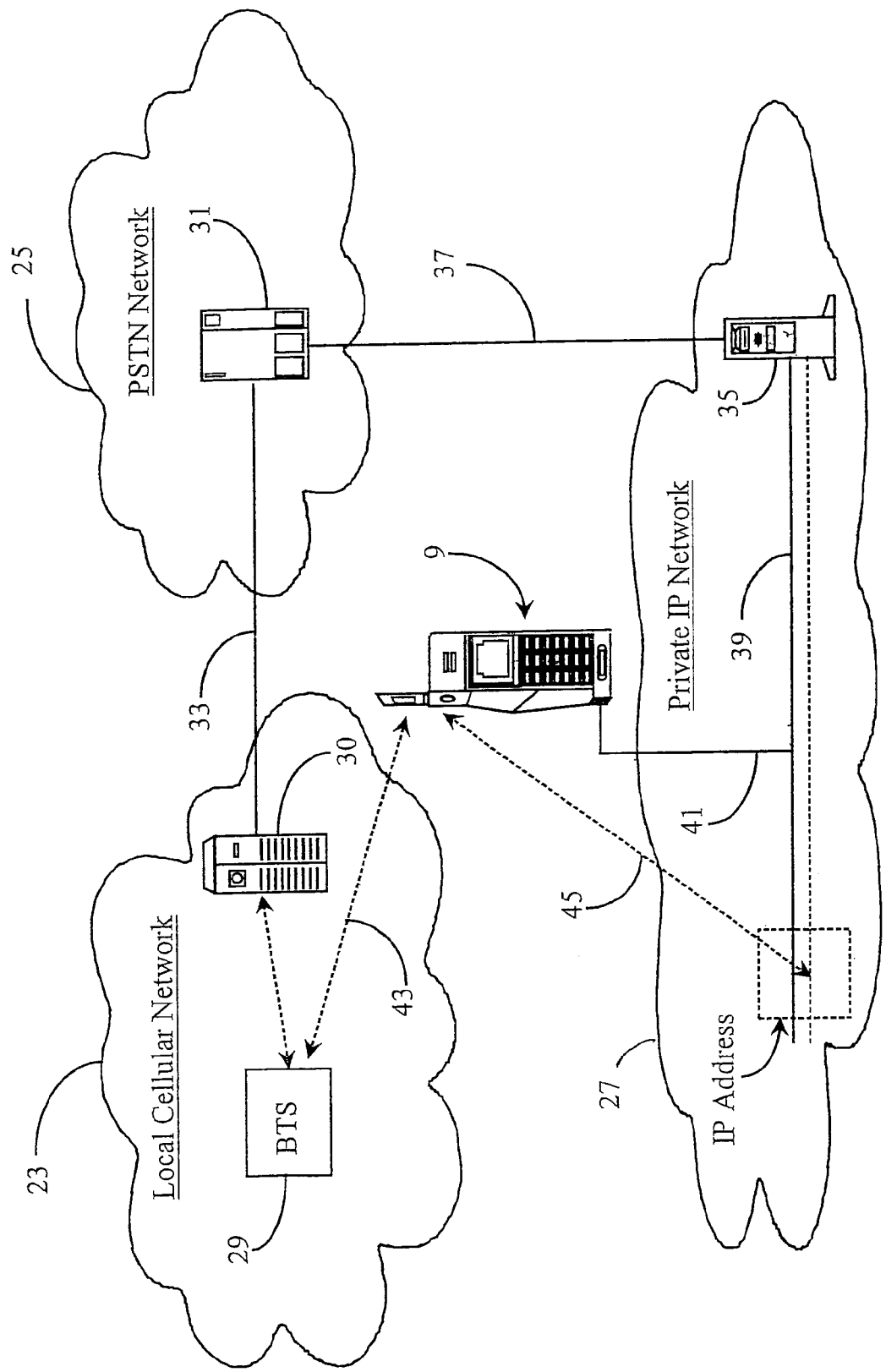
FIG. 2 is an overview of network connection and communication capability of the cell phone of FIG. 1.

FIG. 2 is a system overview of a network connection and communication capability according to an embodiment of the present invention. A local cellular network 23, a local switch 31 in a PSTN network 25, and a private IP network 27 are shown including connection between the networks and phone 9.

Cellular network 23 may be any type of CCN such as is known in the art, including but not limited to GSM-X, TDMA, AMPS, D-AMPS, CDMA-X etc. A base-station-transceiver (BST) 29 is illustrated as a means of communication within network 23. Other related equipment such as additional base-transceiver-stations (BTS), and base-controller-stations (BCS) are not illustrated within cell network 23, but are assumed to be present. It is the number and geographic range of these access stations that determine the extent of a given service area.

If a user travels from one designated cellular service area to another, he is said to be roaming. Such a user may elect to have calls forwarded from one service area to his current service area. However, there is a charge for this roaming service. The further away a user travels from his designated service area, the higher the cost for receiving calls in a visited service area by normal cellular service.

PSTN network 25 may be any type of COST network such as is known in the art. IP network 27 represents a private company network such as may be constructed to cover a large company site, a series of sites or locations, or the like.

Within network 23, there is illustrated a mobile-switching-center (MSC) 30 that is adapted for storing tables and records of information associated with cell network patrons such as cell-phone numbers, a visitor list register (VLR), a home list register (HLR), and so on. Look-up tables such as VLR and HLR tables list who is currently logged-in to a particular service area as is well known in the art of global cellular services. Other functions of MSC 30 include interfacing with wire-line networks such as, in this case, PSTN 25.

MSC 30 is connected via a telephony trunk 33 to the COST telephony switch 31 within PSTN network 25. Calls destined to cell phone 9 arrive at PSTN switch 31, and are typically routed to MSC 30, which also functions as a transfer point or switch to local cellular service area components such as BTS 29, and ultimately to a registered user operating within the service boundary as determined by the VLR or HLR conventions. For example, if a user is roaming to a service area other than service area 23, then the HLR will list his current service area to which a call may then be routed through PSTN 25. Similarly, if a cellular call arrives from the designated service area of a user who has roamed to a new service area, the call is forwarded to that area via PSTN 25.

Telephony switch 31 in this embodiment is connected via trunk 37 to an IP switch 35 illustrated within IP network 27. In this case signal conversion from analog to digital form is performed in IP switch 35. In another embodiment, a standard gateway such as an SS-7 gateway may be used. IP switch 35 distributes incoming calls over network 27 according to existing protocol and infrastructure. For example, if IP network 27 comprises a wired network, then a LAN 39 is the medium through which calls are delivered. If IP network 27 is a wireless network, then a wireless LAN 38 is the medium over which calls are delivered. In some cases, a combination-of wired and wireless forms of LAN communication is possible.

In this exemplary embodiment, cell phone 9 may communicate via cellular network in normal fashion as illustrated via dotted double-arrow 43. In addition to normal cellular communication, cell phone 9 may communicate in wireless mode on wireless IP LAN 38 as illustrated via dotted double-arrow 45. In some embodiments wherein LAN 38 is of a separate wireless transmission technology that is not compatible to cellular transmission, then a network adapter (not shown) would be plugged into port 13 of FIG. 1 to enable voice communication. Cell phone 9 may communicate on wired LAN 39 via access cable 41 connected to port 11 of phone 9 (FIG. 1), which may be a 10-base D adapter (common in the art). When a user operating cell phone 9 logs-on to either LAN (38 or 39) he or she is assigned a temporary IP address for purposes of device identification. This is illustrated via a dotted rectangle labeled IP Address.

Once logged on to the LAN, cell phone 9 operates as any other LAN-connected telecommunications device facilitating two-way voice communication. Forwarded calls to cell phone 9 will arrive via PSTN 25 over trunk 37 to IP switch 35 where they are distributed accordingly. It is important to note here that this basic embodiment illustrates connectivity and capability only, and not routing method or control techniques. Routing method and equipment used to control the disposition and to send parameters of cell phone 9 when logged on to a LAN such as LANs 39 or 38 is provided in more detail below.

Figure 3:
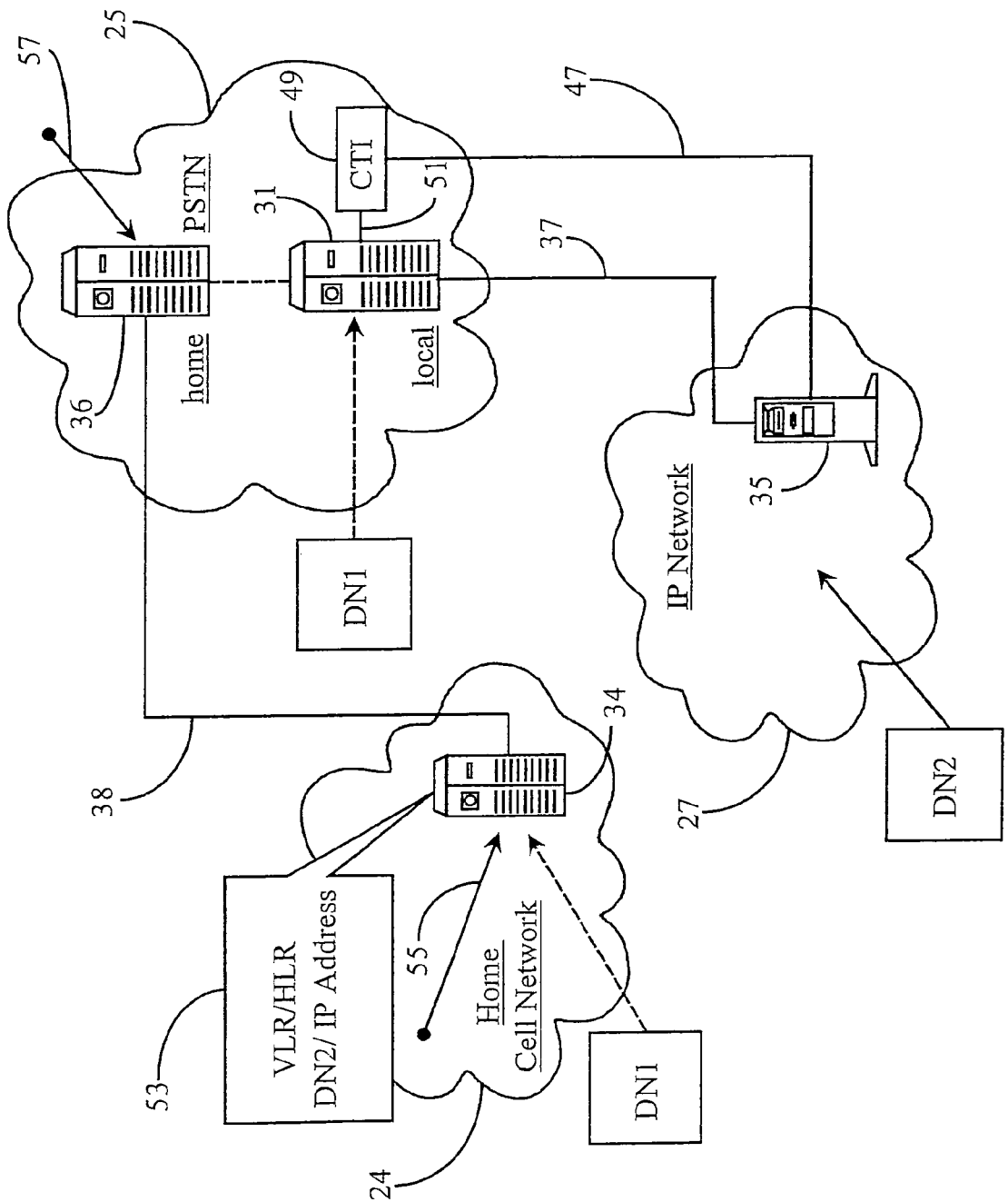
FIG. 3 is a basic overview of a service-orientated routing and control system used with the cell phone of FIG. 1 according to an embodiment of the present invention.

FIG. 3 is an overview of a routing and control system used with cell phone 9 according to an embodiment of the present invention. In this embodiment telephony switch 31 is linked to a CTI processor 49 via a CTI connection 51. CTI processor 49 provides intelligent routing capability to switch 31 by virtue of added software known as T-server software to the inventor. A separate digital link 47 links CTI processor 49 to IP switch 35 to provide control from within IP network 27. Other equipment may be assumed to be present within network 52 such as an interactive voice response unit (IVR) and/or a statistical server.

Cell network 24 in FIG. 3 is the user's home area network, not the network local to IP network 27. Calls arriving at an MSC 34 in home cellular network 24 are represented by vector 55. Routing determination of calls 55 is based on a published cell-phone number which a caller wishing to reach cell phone 9 would dial. This is a first destination number (DN 1) associated with MSC 34.

A second destination number (DN 2) is shown illustrated within IP network 27 as an address (IP address) on a particular LAN such as LAN 38 or 39 of FIG. 2.

Referring again to FIG. 3, when a user, via the dual-mode device 9, logs onto network 27 via LAN 38 or 39 of FIG. 2, he or she will, during configuration, obtain a new and temporary IP address (DN 2) as previously described. Alternatively, a roaming IP address may be used, that would be fixed for the device, if the connected to network supports this feature. Such technologies are known to the inventor. This service may be made available an address allocation protocol such as Dynamic Host Configuration Protocol (DHCP) which is well known in the art for the configuration of telecommunications devices on local IP networks.

After a temporary IP address is established, a routing system comprising connected equipment and software as illustrated via CTI processor 49 causes the input information (IP address associated with dialable cell-phone number to be made available to first destination switches/centers such as a switch 36 (PSTN) and MSC 34 (cell-network). Such information would be provided to MSC 34 and added to information 53 if the service is provided by the cellular provider.

After configuration of cell phone 9 is complete, the IP address and DN 2 are now registered at MSC 34 as illustrated via an information block 53 which includes VLR and HLR information. This would be the case for a cellular network hosting the service. Virtually any information may be relayed back to first destination points (DN 1) at PSTN switch 36, or at MSC 34.

If the service is provided by a non-cellular provider, then a separate dialable number must be provided in addition to the cellular phone number as a planned destination for incoming calls to PSTN switch 36. This service is available from most telephone-network providers in the form of the well known destination number identification service (DNIS). Alternatively, the regular number can be forwarded to the access point.

According to one embodiment of the present invention, call 55 may arrive at MSC 34 from within cellular network 24. A look-up of the HLR indicates that the owner of the device called is not within range of the local service area. If no current cellular service area where the user is currently operating is indicated in MSC 34 at the time of call 55, then the system looks for forwarding information and finds an IP address associated with the user's cell phone number. MSC 34 then routes call 55 via a trunk 38 to switch 36. Call 55 is then routed on through to IP switch 35 (via local switch 31) in network 27 via trunk 37 from switch 31 based on the IP address.

An appropriate signal-conversion bridge is used to convert signal as previously described. Such conversion may be performed in IP switch 35 or a trunk-connected bridge. The converted digital call is then routed over the LAN to DN 2, which in this case is the assigned IP address of cell phone 9. LAN communication may be wireless or wired as previously described.

It is important to note here that the roaming distance (distance from primary service area to IP network as measured in consecutive cellular service boundaries) may be considerable and that the PSTN network components illustrated in this embodiment represent both components local to a primary cellular service boundary such as network 24 and those local to a visited IP network such as network 27 as well as any long-distance in between. First destination numbers will invariably be assigned to a local PSTN switch or service control point (SCP) wherein further routing is determined via information provided at the time of configuration of cell phone 9 at a visited IP network.

The example described above of an instance of a cellular call 55 placed to cell phone 9 assumes that the user is talking all cellular calls in IP format while logged-on to IP network 27. All such calls would then be routed via PSTN 25 to IP network 27. However, it may be that certain cellular calls will be exempt from IP delivery at the user's discretion. In this case, callers from known origination numbers will be routed to local cell network 23, local to the visited IP network, and therefore may be received by the user of telephone 9 in normal cell-phone mode.

As an example of a COST call 57 arriving at switch 36, call 57 is held while a check is made to MSC 34 which reports that the user is not in the area and gives DN 2 information over trunk 38 to switch 34. Once destination is confirmed, call 57 is routed through PSTN 25 to switch 31, then via truck 37 into IP switch 35 where it may then be routed to DN 2. If cell phone 9 is not logged on to IP network 27, then call 57 would be routed to the appropriate cellular service area based on registered DN 2, which in this case, would be the actual cell-phone number instead of an IP address.

It will be apparent to one with skill in the art that by logging on to an IP network such as network 27, wherein CTI enhancement is made to a locally-connected PSTN switch, such as to switch 31, via CTI processor 49 and control line 47, information including IP addresses, assigned destination numbers, as well as routing preferences and rules may be made available to primary cellular service area (23) and to PSTN switches (36). In some embodiments, routing routines may be customized by a user and directed to certain callers. Such options may be made available through T-server control routines (known to the inventor) executing on a connected CTI processor such as processor 49.

The method and apparatus of the present invention allows a mobile user to save roaming cellular charges by routing over an IP network instead of through a cellular service area. A corporation having many mobile reps wherein the company pays for cellular charges could realize significant cost savings.

It will be apparent to one with skill in the art that the present invention may be practiced with wide area networks (WANs) in addition to LANs without departing from the spirit and scope of the present invention. As long as the appropriate protocol is used and conversion methods are observed when required, the present invention may be utilized with any IP switched packet network. Such an example would be that of a mobile overseer of several companies or partners that are interconnected through an IP WAN. The method and apparatus of the present invention should be afforded the broadest scope possible. The spirit and scope of the present invention is limited only by the claims that follow.

What is claimed is:

1. A mobile communication device comprising:
    software executing from memory on the mobile communication device enabling user selection of one of a plurality of selectable networks for communication, and enabling implementation of transmission and receipt of data in a format compatible with the selected network;
    plural physical interfaces for connecting to individual ones of the selectable networks, the physical interfaces comprise two or more of a wireless interface to a cellular system, a connection interface to a local area network, and a receptacle for a Connection-Oriented Switched Telephony (COST) telephone line; and
    wherein the selectable networks include two or more of a Public Switched Telephone Network (PSTN), a cellular telephone network, a Local Area Network (LAN) and an Internet Protocol (IP) packet network and the software enables data communication with the selected network via at least one of the physical interfaces for connecting to the selected networks.

2. The device of claim 1 wherein the software, upon connection to a LAN, assigns a temporary IP address to the device for IP communication.

3. A method for enhancing communication using a mobile device, comprising steps of:
    (a) providing the mobile device with software from memory enabling user selection of a network for communication, including two or more of a Public Switched Telephone Network (PSTN), a cellular telephone network, a Local Area Network (LAN) and an Internet Protocol (IP) packet network and enabling implementation of transmission and receipt of data in a format compatible with the selected network;
    (b) providing the mobile device with plural physical interfaces for connecting to individual ones of the selectable networks, the physical interfaces comprise two or more of a wireless interface to a cellular system, a connection interface to a local area network, and a receptacle for a Connection-Oriented Switched Telephony (COST) telephone line; and
    (c) selecting a network by a user causing data transmission via the physical interface provided for the selected network.

4. The method of claim 3 wherein the software, upon connection to a LAN, assigns a temporary IP address to the device for IP communication.

* * * * *

UNITED STATES PATENT AND TRADEMARK OFFICE
CERTIFICATE OF CORRECTION

PATENT NO.       : 7,613,174 B2                          Page 1 of 1
APPLICATION NO. : 11/386550
DATED            : November 3, 2009
INVENTOR(S)      : Leonid A. Yegoshin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Nineteenth Day of October, 2010

David J. Kappos
*Director of the United States Patent and Trademark Office*